Patented Sept. 3, 1946

2,407,039

UNITED STATES PATENT OFFICE 2,407,039

MANUFACTURE OF VINYL CHLORIDE

Herbert Muggleton Stanley, Tadworth, England, assignor to The Distillers Company Limited, Edinburgh, Scotland, a British company No Drawing. Application September 23, 1942, Serial No. 459,441. In Great Britain July 1, 1941

5 Claims. (Cl. 260—656)

It is known that vinyl chloride can be prepared by reacting acetylene and hydrogen chloride at an elevated temperature in the presence of a solid catalyst consisting of mercuric chloride supported on active carbon or other surface-active carrier. The reaction is strongly exothermic and loss of mercury takes place from the catalyst when the process is conducted in this manner, whilst local overheating, which results in secondary reactions taking place is difficult to avoid.

According to the present invention acetylene and a hydrogen chloride are reacted together at an elevated temperature in the presence of a catalyst consisting of a mercury compound, supported on active carbon and suspended in an inert liquid diluent, such as a hydrocarbon or halogenated hydrocarbon, which is liquid at the temperature of the reaction. The preferred catalyst is mercuric chloride. The presence of a quantity of diluent has been found, somewhat surprisingly, to have no adverse influence on the activity of the catalyst whilst on the other hand improved results are obtained. The presence of the diluent enables the temperature of the reaction medium to be controlled more accurately, as, for example, by means of cooling coils or jackets. We have also found that, working in this manner, the catalyst retains its activity over long periods. A further advantage is that less of the active carbon support is required in this process than when no diluent is employed.

Among the liquid substances suitable as diluents, are included for example paraffin oil, di-isopropylbenzene and pentachloroethane, but other inert liquid hydrocarbons or halogenated hydrocarbons, boiling at a temperature higher than the reaction temperature may be employed; we have found that the optimum temperature of the reaction lies between 120° and 150° C.

The process may be carried out by preheating to the desired temperature a suspension of the supported catalyst in the diluent liquid, and passing into this a gas mixture of acetylene and hydrogen chloride, the whole being vigorously agitated. External heating is then stopped, and the temperature of the reaction medium is thereafter controlled by cooling.

Examples

Example 1.—18 parts of a finely powdered decolorising carbon known under the trade name "Super Norit" (Norit being a registered trademark) were impregnated with a solution of 6 parts of mercuric chloride in methyl alcohol, dried in vacuo and thereafter suspended in 300 parts of paraffin oil. A gaseous mixture of approximately equal parts of acetylene and hydrogen chloride was blown through the liquid, which was stirred. The reaction temperature was kept at 140° C., the heat of reaction being removed by means of a cooling jacket. 17 parts of vinyl chloride per hour were condensed out of the gases leaving the reaction vessel. This output remained constant over a long period of operation.

Example 2.—30 parts of active carbon were impregnated with 6 parts of mercuric chloride and the catalyst thus obtained, after drying, was suspended in 300 parts of di-isopropyl benzene (B. P. 200° to 210° C.). The suspension was filled into a packed tower and a mixture of acetylene and hydrogen chloride bubbled through the tower, keeping the temperature at 135° C. by cooling. The exit gases were led through a reflux condenser and yielded 16 parts of vinyl chloride per hour, 75% of the introduced acetylene being converted into vinyl chloride.

Example 3.—A granular gas-absorption carbon was finely powdered, impregnated with mercuric chloride and suspended in pentachloroethane (B. P. 159° C.). Acetylene and hydrogen chloride were reacted in the presence of the catalyst suspension and results similar to those of the preceding examples were obtained.

It will be appreciated that any suitable mercury compound other than mercuric chloride may be used, e. g. mercurous chloride.

What I claim is:

1. A process for the manufacture of vinyl chloride which comprises passing acetylene and hydrogen chloride into a suspension of active carbon impregnated with mercuric chloride in an inert diluent, selected from the group consisting of hydrocarbons and chlorinated hydrocarbons which are liquid between 120° and 150° C. and which do not dissolve mercuric chloride, which inert diluent is maintained at a temperature between 120° and 150° C.

2. A process according to claim 1 wherein the suspension of the supported catalyst in the diluent is pre-heated to the reaction temperature and a gaseous mixture of acetylene and hydrogen chloride is introduced into said suspension with violent agitation.

3. A process for the manufacture of vinyl chloride which comprises passing acetylene and hydrogen chloride into a suspension in paraffin oil of active carbon impregnated with mercuric chloride, said paraffin oil being maintained at a temperature between 120° and 150° C.

4. A process for the manufacture of vinyl chloride which comprises passing acetylene and hydrogen chloride into a suspension in di-isopropylbenzene of active carbon impregnated with mercuric chloride, said di-isopropylbenzene being maintained at a temperature between 120° and 150° C.

5. A process for the manufacture of vinyl chloride which comprises passing acetylene and hydrogen chloride into a suspension in pentachloroethane of active carbon impregnated with mercuric chloride, said pentachloroethane being maintained at a temperature between 120° and 150° C.

HERBERT MUGGLETON STANLEY.